Patented June 11, 1935

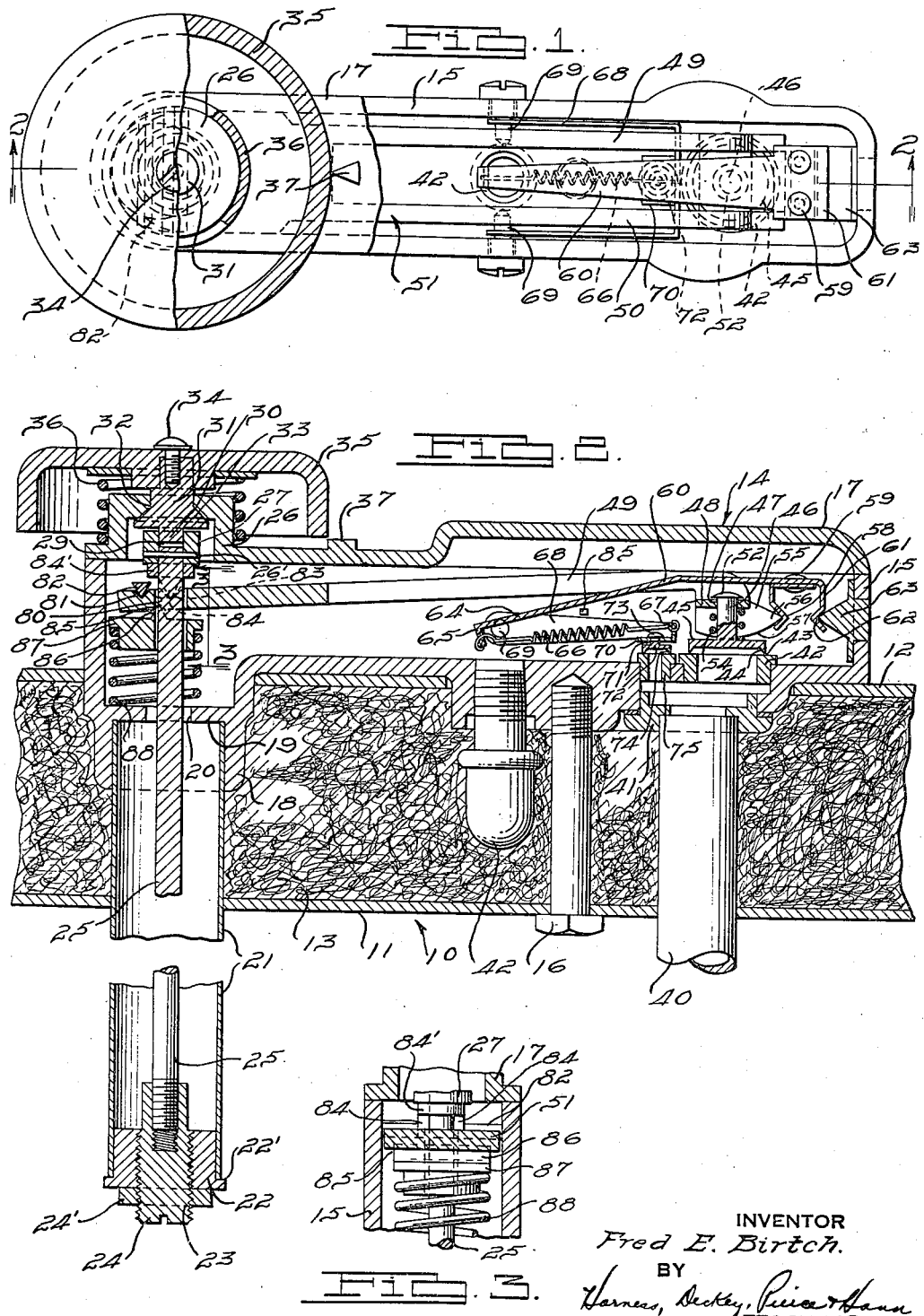

2,004,597

UNITED STATES PATENT OFFICE 2,004,597

OVEN REGULATOR

Fred E. Birtch, Detroit, Mich.

Application August 31, 1931, Serial No. 560,364

21 Claims. (Cl. 236—15)

The invention relates to fluid regulating devices and it has particular relation to a device for regulating the flow of gas to a burner operatively associated with an oven such as that ordinarily provided on gas stoves, ranges and the like.

The principal objects of the invention are to provide an improved temperature controlled device for controlling the flow of gas to an oven burner in a gas stove, and consequently a better control of the temperature of the oven; to provide a gas regulator by means of which the temperature of the oven can be more uniformly and positively controlled over a larger range of temperatures; to provide a temperature controlled gas regulator which will insure a flow of gas to the burner sufficient for combustion purposes up to a definite point when the gas is completely shut off; to provide a temperature controlled, gas regulator for an oven burner, which will more accurately compensate for the sensitive heat in the oven, when the temperature in the latter approaches a predetermined degree desired; to provide a temperature controlled regulator for controlling the flow utilized for heating purposes, in a more satisfactory manner, in order that a compartment or the like heated by the fluid, may be efficiently used under conditions where securing a predetermined temperature and maintaining such temperature in the compartment are of considerable importance; and to provide an improved method of controlling the heating of an oven or the like, by means of which the temperature may be increased and maintained in a more satisfactory manner.

For a better understanding of the invention, reference may be had to the accompanying drawing forming a part of the specification, wherein:

Fig. 1 is a plan view of a gas regulator constructed according to one form of the invention, with certain parts broken away for the purposes of clarity.

Fig. 2 is a cross sectional view taken substantially along the line 2—2 of Fig. 1;

Fig. 3 is a cross sectional view taken substantially along line 3—3 of Fig. 2.

Referring to Fig. 2, a wall of a gas oven is indicated generally at 10 and comprises inner and outer linings 11 and 12 and an intermediate layer of insulating material 13. A gas regulator for controlling the supply of gas to the burner for the oven, is indicated generally at 14 and comprises an inner casing part 15 attached to the outer lining 12 by means of one or more bolts 16 extending through the oven wall and threaded into the base, and a cover part 17 which may be secured to the part 15 by any suitable means such as screws or the like. At one end the inner part 15 of the casing, has a tubular portion 18 projecting into a complementary aperture in the oven wall, which is provided with an interior wall 19 centrally apertured as indicated at 20. The inner end of the tubular portion 18 receives one end of a copper tube 21 which abuts the wall 19. The tube 21 projects interiorly of the oven and at its inner end is provided with a collar 22 largely located within the end thereof and having a shoulder 22' engaging the end of the tube. This collar is provided with a central threaded aperture 23 which receives a threaded adjusting member 24 that normally projects interiorly of the tube 21 beyond the inner wall of the collar. A nut 24' on the member serves to lock it in an adjusted position. The inner end of the member 24 is threaded on one end of a rod 25 which is composed of invar or other suitable metal which will have little expansion and contraction when subjected to changes in temperature. The rod 25 extends through the tube 21, through the aperture 20 in the wall 19 of the tubular portion 18 of the casing, and terminates in an offset portion 26 of the cover 17.

This end of the rod 25 is non-rotatably secured by a pin 26" to a cap 27 and the end wall of the cap 27 is provided with a polygonal recess 29 which receives a complementary projection 30 formed on the inner end of a short stub shaft 31 projecting outwardly through the wall of the offset portion 26 of the cover. The stub shaft 31 is prevented from outward movement by means of a tapered head portion 32 inwardly of the casing, which engages a complementary surface 33 on the inner side of the cover. Outwardly of the cover, the stub shaft 31 is secured by means of a screw 34 to an adjusting disc 35. A coil spring 36 disposed between the disc 35 and the outer wall of the covering, and around the offset portion 26 of the latter, resiliently maintains the tapered head 32 of the shaft 31 against the surface 33, and consequently maintains the parts in proper relation and prevents the escape of gas from the casing.

The disc 35 is provided with circumferentially spaced graduations, or a scale, indicating a range of temperatures and the temperature of the oven is indicated by a marker 37 on the outer wall of the cover adjacent the graduated part of the disc. The copper tube 21 of course will expand and contract considerably when the temperature in the oven changes, it being understood that the copper tube will elongate when the temperature rises, and contract when the temperature decreases. When the temperature of the oven changes and the tube either elongates or decreases in length as the case may be, the rod 25 will be moved inwardly or outwardly of the oven wall depending on the movement of the tube, and this movement of the rod is utilized for governing the flow of gas to the oven burner. The threaded member 24 serves as a means for initially adjusting the position of the rod so that the disc 35 in conjunction with the marker 37, will indicate the proper temperature in the oven.

Gas for the oven burner, flows through a conduit 40, one end of which projects through the oven wall and is secured to the base portion of the casing 15 by means of a sealing nut 41, it being understood that any suitable arrangement may be provided for connecting this end of the conduit to the regulator casing in such manner that gas cannot escape around the connection. Gas is conducted to the interior of the regulator casing 15 by means of a conduit 42 located for example, in the wall of the oven and which has an end threaded into the base portion of the casing. Adjacent the end of the conduit 40 connected to the casing 15, the base wall of the casing is provided with a tubular valve seat 42 which may be threaded into the base. The outer end wall of this valve seat defines a plane surface indicated at 43 which is adapted to cooperate with an annular, sharp edge flange 44 formed on the adjacent side of a valve disc 45. When the disc 45 is moved against the surface 43, the sharp annular edge 44 will engage the surface and close the open center of the tubular valve seat 42 which communicates with the interior of the regulator casing and hence prevent gas from flowing from the interior of the casing past the valve disc 45 and into the conduit.

The disc 45 is mounted on one end of a pin 46 which slidably projects through an opening 47 formed in a tie plate 48 interconnecting arms 49 and 50 as shown by Fig. 1, of a bifurcated lever 51. The free end of the pin 46 is provided with a head 52 and this head and spring 54 encircling the pin 46 between the plate and the disc, normally tending to maintain the head 52 against the plate.

Adjacent the plate 48 the arms 49 and 50 are provided with inwardly offset portions 55 terminating in substantially V-shape fulcruming portions 56, and inwardly of the plate, the offset portions have convex edges 57 which are adapted to engage the valve disc under certain circumstances which will be pointed out hereinafter. The V-shaped portions 56 fulcrum in complementary notches formed in an angular, metal blade 58 which is secured by means of rivets 59 to a metal blade 60 extending longitudinally between the arms 49 and 50 of the lever 51.

The blade 60 at its end adjacent the blade 58, has an inwardly offset portion 61 provided with a V-shaped portion 62 which fulcrums on a V-shaped member 63 secured to the casing wall. The opposite end of the blade 60 is inwardly inclined as indicated at 64 and terminates in an offset portion 65, which is secured to one end of a coil spring 66. The opposite end of the coil spring is secured as indicated at 67, to the free end of a U-shaped arm 68 pivotally mounted as indicated at 69 to the walls of the casing. The free end of arm 68 is provided with an offset plate portion 70 which is provided with an aperture loosely receiving a pin 71 formed on a second valve disc 72. The pin 71 at that side of the plate opposite the valve disc 72, is provided with a head 73 which, in conjunction with the valve disc, maintains the pin on the plate. The valve disc is provided with an annular sharp edge projection 74 on its inner surface which cooperates with the outer plane wall surface of a valve seat 76 similar to the valve seat 42. In this connection it is desired to call attention to the fact that the central openings in the valve seats 42 and 75 permitting the flow of gas therethrough vary considerably in dimensions, the valve seat 42 permitting the flow of a large amount of gas, and the valve seat 75 permitting a flow of gas therethrough which if used alone, is substantially only sufficient to bring the oven up to and maintain the maximum temperature setting.

The opposite end of the lever 51 is provided with an opening 80 receiving the rod 25, and a V-shaped notch 81 in its outer surface which fulcrums on a V-shaped projection 82 rigidly secured to one wall of the regulator casing. Adjacent the notch 81, and substantially in alignment with the rod 25, the lever 51 is provided with other notches 83 on its outer surface, which cooperate with V-shaped projections 84 integral with a plate 84' slidably mounted on the outer end of the rod, and normally abutting the cap 27. The inner surface of the lever 51 is provided with a V-shaped notch 85 located intermediate the notches 81 and 83, which cooperates with a V-shaped projection 86 integral with a collar 87 slidably mounted on the rod 25 inwardly of the lever. A spring 88 encircling the rod 25 and disposed between the wall 19 of the regulator casing, and a shoulder on the collar 87 normally maintains the collar in its outer position, with the V-shaped projection 86 engaging the notch 85 in the inner surface of the lever 51.

The device as illustrated, shows both of the valves closed, and accordingly no gas is flowing to the burner, it being understood that a pilot light is provided to ignite the burner when gas is supplied thereto and that a main control valve is used which is open only when the oven is to be used. Assuming that it is desired to increase the temperature of the oven, the disc 35 is turned counter-clockwise as seen in Fig. 1 until the proper indicia on the disc indicating the temperature desired coincides with the marker 37, it being understood that the adjusting member 24 has initially been so adjusted with respect to the rod 25 that the temperature of the oven will correspond to that indicated by the disc. Movement of the disc 35 in this manner causes the cap 27 to turn correspondingly and the rod 25 to turn correspondingly in the adjusting element 24 at the opposite end of the copper tube, and hence the cap 27 is moved outwardly toward the disc 35 and the plate 84' carrying the V-shaped projections 84 correspondingly moves with the cap owing to the action of the spring 88 tending to force the lever 51 and consequently the member 84' toward the disc. As the lever 51 moves in this manner, it fulcrums about the stationary projection 82 and the spring 88 acting through the projection 86 moves the outer end of the lever, which in turn moves the tie plate 47 against the head 52 on pin 46. This movement of the lever also moves the blades 58 and 60 about fulcrum 63, and just before the tie plate 47 lifts the valve disc 45 the spring 66 moves past pivot 69 and the valve disc 72 uncovers valve seat 75, and then the tie plate moves valve disc 45 away from valve seat 42, the amount the valve opens being limited by the free end of blade 60 engaging the inner surface of the cover 17. Opening of the valve disc 72 is limited by a stop 85 on the casing.

Now as the temperature in the oven increases, the copper tube 21 will elongate, and pull the rod 25 inwardly of the oven, which in turn will cause a movement of the cap 27, and then the latter engages and moves plate 84' carrying the projection 84 in the same direction. This will cause the projections 84 to move the lever 51 about the V-shaped projections 82 as a fulcrum, it being understood that the spring 88 is sufficiently strong to maintain the end of the lever in engagement with the projection 82 during such fulcruming movement. Movement of the lever 51 about the projection 82 causes the outer end of the lever to move inwardly and the valve disc 45 to move toward the valve seat 42, thereby gradually throttling the flow of gas therethrough. This movement of the lever also causes an inward movement of the blade 60 about the V-shaped projection 63 and hence the gradual movement of the spring 66 inwardly toward the pivot 69. Assuming that the disc 35 has been set to obtain a temperature of 500 degrees in the oven, the parts are so arranged, that the valve disc 45 will finally seat on the valve seat 42 when the oven reaches a temperature near 500 degrees. After the valve disc 45 is seated on valve seat 42, the adjacent end of lever 51 still is permitted to move inwardly toward the valve disc because of the slidable engagement of the pin 46 with the tie plate 47 of the lever. After the valve disc 45 is seated on valve seat 42, a smaller quantity of gas flows through the valve seat 75 to the burner, and the temperature in the oven will increase uniformly and more slowly to several degrees over the final 500 degree temperature desired.

As the temperature of the oven increases slightly above 500 degrees, the movement of the lever 51 will cause the spring 66 to move past the pivot 69 and then the spring will be so positioned that it will quickly close the small valve and cut off all gas to the burner. Later as the temperature decreases slightly below 500 degrees, the copper tube contracting will cause the small valve to open and supply a small quantity of gas to the burner sufficient to increase the temperature, to slightly above the temperature desired and then the valve will close. Normally the small valve, opening and closing will maintain the temperature of the oven, once it has been brought up quickly from a low temperature by gas furnished through both the valves.

If it is desired to obtained and maintain a lower temperature in the oven after such conditions prevail, the disc 35 is turned in the opposite direction a desired amount which will cause the projections 84 to move the lever 51 about fulcrum 82 further inward, but this movement is permitted because of the slidable engagement between the pin 46 and the tie plate 48, at the end of the lever adjacent the valves. The low temperature desired may be such that the lever 51 must moved on pin 46 until it engages the disc 45, in which event it will then fulcrum on the disc and if the disc 35 still is turned to reach the low temperature position, the projection 84 will move the lever inwardly away from the projection 82, about the fulcrum on the disc 45, movement of the lever on the pin 46 and against the valve disc will cause the blades 58 and 60 to move inwardly but the degree of movement is not sufficient to cause the free end of the blade 60 to engage the base of the casing 15. While and if the lever is fulcruming on valve disc 45, the projections 56 thereon will cause slight movement of the blades outwardly but normally the disc 35 will never be turned down sufficiently to cause such movement to be sufficient to open the small valve. When the temperature in the oven gradually decreases, the valves will remain closed until the temperature is slightly below the temperature desired when the rod 25 will have moved outwardly owing to contraction of the copper tube 21, thereby permitting the spring 88 to move this end of the lever outwardly until it engages projection 82. During this movement of the lever, the other end thereof moves away from valve disc 45, and the blades move also, but the valves remain closed. Continued decrease in temperature and movement of the lever by the spring 88 causes it to fulcrum about projection 82 which opens the small valve and the temperature of the oven is then increased and then when the temperature is increased slightly above that desired, the small valve is again closed.

When maintaining the oven at a predetermined temperature, contraction and expansion of the copper tube normally will cause only opening and closing of the small valve, and such operations will occur very near the temperature desired in the oven so as to maintain a substantially constant pressure.

If the temperature in the oven is that of room temperature, and it is desired to secure a rather high or baking temperature, it will be observed that initially the cap 27 will be nearer the disc 35 because the copper tube being at room temperature is quite contracted. While the valves initially will be open under such conditions, the turning of the disc will cause movement of the cap 27 outward still farther, and the valves will remain open for a longer period of time until expansion of the tube 21 causes the plate 84' to close the valves sequentially in the manner previously explained.

A device such as that described is very efficient for obtaining and maintaining a predetermined temperature in the oven, over wide ranges of temperatures and particularly the lower ranges of temperatures. It is particularly advantageous in an insulated type of oven, where little heat escapes, and the sensitive heat in the oven, when the temperature in the oven approaches that desired, must be controlled accurately to prevent obtaining a higher temperature. The use of a large throttle valve permits obtaining a rapid rise in temperature in the oven, and a gradual throttling of gas as the temperature approaches that to which the device is set to obtain. The use of a smaller, snap valve, supplying a small quantity of gas sufficient for combustion purposes, after the larger valve is closed, more slowly and uniformly brings the temperature to that desired, and maintains such temperature.

Although but one specific embodiment of this invention has been herein shown and described, it will be understood that numerous details of the construction shown may be altered or omitted without departing from the spirit of this invention as defined by the following claims.

I claim:

1. A temperature controlled device for controlling the supply of gas to a burner, comprising means operable temporarily for supplying gas to the burner as the temperature in a given space affected by the burner increases, a snap valve operable temporarily after the first means becomes inoperative, for supplying a smaller quantity of gas to the burner, and then completely stopping such flow to the burner, and temperature control means for actuating the valve and first means.

2. A temperature controlled device for controlling the supply of gas to a burner, comprising means for gradually throttling the flow of gas to the burner as the temperature in a given space affected by the burner increases, and snap action means operable temporarily after the first means becomes inoperative for supplying a smaller quantity of gas to the burner and then quickly cutting off said smaller quantity of gas.

3. A temperature controlled heat regulator for ovens or the like, comprising means operable temporarily for gradually reducing the heat supplied to the oven as the temperature increases, and snap action means operable after the first means becomes inoperative and the temperature approaches that desired in the oven, for supplying a smaller and substantially uniform quantity of heat until the temperature is approximately that desired, and then quickly cutting off the heat supply.

4. A temperature controlled heat regulator for ovens or the like, comprising means for supplying and gradually diminishing the supply of gas to the oven burner and then temporarily supplying a smaller uniform quantity of gas to the burner, snap action means operable after a predetermined time for quickly cutting off the smaller quantity of gas supplied to the burner, and temperature control means for actuating said snap action means and first means.

5. A temperature controlled gas regulator for ovens or the like comprising a valve for supplying a large quantity of gas to the oven burner, a valve for supplying a smaller quantity of gas to the burner, means operable automatically for gradually closing the large valve as the temperature approaches a predetermined degree, and finally closing the valve before such temperature is reached, snap action means operable automatically for temporarily maintaining the small valve open after the large valve is closed and then quickly closing the small valve without any substantially throttling of the gas flow therethrough, and temperature control means for actuating said snap action means and first means.

6. A temperature controlled gas regulator for ovens or the like, comprising a throttling valve and a substantially constant supply valve for supplying gas to the oven burner and means for automatically closing said valves in sequential order as the temperature in the oven increases.

7. A temperature controlled gas regulator for ovens or the like, comprising a large valve for supplying a large quantity of gas to the burner, a smaller valve for supplying a smaller quantity of gas to the burner after the large valve is closed, a thermostat for governing the temperature of the oven or space to be heated, an arm connected to the large valve for moving the latter, means operatively connecting the arm to the thermostat, and snap action means operatively connected to the arm and smaller valve, the parts being so arranged that the thermostat first effects closing of the large valve as the temperature reaches a predetermined degree, and then allows the smaller valve to remain open for an interval, after which the thermostat and arm effect a snap closing of the small valve.

8. A temperature controlled gas regulator for ovens or the like, comprising a large valve for supplying a large quantity of gas to the burner to rapidly increase the temperature of the oven or space being heated, a smaller valve for supplying a smaller quantity of gas to the burner to diminish the temperature rise after the large valve is closed, a thermostat for governing the temperature of the oven or space to be heated, an arm operatively connected to the thermostat and large valve for closing the latter after the temperature of the oven or space has been brought up rapidly to a predetermined degree, and snap action means operatively connected to the arm and to the small valve, for quickly closing the latter after it is open for an interval following closing of the large valve, said parts being so related that after the large valve is closed, the smaller valve will alternately close and open in a snap action manner to maintain the desired temperature in the oven or space being heated.

9. A temperature controlled gas regulator for ovens or the like, comprising a large valve for supplying a large quantity of gas to the burner to rapidly increase the temperature of the oven or space being heated, a smaller valve for supplying a smaller quantity of gas to the burner after the larger valve is closed, a thermostat for governing the temperature of the oven or space, a stationary support, an arm fulcrumed on the stationary support and operatively connected to the thermostat so as to be fulcrumed by the latter, means operatively connecting the arm to the large valve for effecting gradual closing of the latter as the temperature of the oven or space increases and the thermostat functions, a second arm fulcrumed on a stationary support, snap action means connecting the second arm to the smaller valve, and means operatively connecting the arms for operating the snap action means after the large valve is closed, so that upon alternating small increase and decrease in temperature after the large valve is closed, the small valve is alternately closed and opened respectively, in a snap action manner to maintain the temperature desired.

10. A temperature controlled gas regulator for ovens or the like, comprising a large valve for supplying a large quantity of gas to the burner, a smaller valve for supplying a smaller quantity of gas to the burner after the large valve is closed, a thermostat, an arm fulcrumed on a stationary support and operatively connected to the thermostat, means connecting the arm to the large valve, a second arm fulcrumed on a stationary support and having fulcruming engagement with the first arm, and snap action means connecting the second arm to the smaller valve, the parts being so related that upon heating of the oven or space, the first arm first closes the large valve, and then upon continued movement thereof and fulcruming of the second arm on its support, the snap action means operates to quickly close the smaller valve.

11. A temperature controlled gas regulator for ovens or the like, comprising large and small valves for supplying gas to the burner, a support, an arm pivoted on the support and connected at its free end to the small valve, another arm fulcrumed on the support and connected to the large valve, a thermostat for moving the arm about its fulcrum and hence operating the large valve, and spring means operatively connected to the last arm and to the free end of the first arm and so related to the pivot of the latter that upon movement of the thermostat, the large valve is first closed and then upon continued movement of the arm connected thereto the spring moves past the pivot of the arm connected to the smaller valve and causes the latter to snap closed.

12. A temperature control device for controlling the supply of heat to an oven space or the like, comprising means operable temporarily for supplying heat to the space and rapidly increasing the temperature therein, means for rendering the first means ineffective upon reaching a predetermined temperature below that desired in such space, means for supplying a smaller quantity of heat at a substantially constant rate after the temperature reaches such predetermined degree, for the purpose of more gradually increasing the temperature to that desired, and snap action means for quickly shutting off the supply of heat last mentioned after the temperature in the space substantially reaches such desired degree.

13. A heat interchange device comprising a support, fulcrum means on the support, an arm abutting one side of the fulcrum means, means operatively connected to the arm for controlling the supply of heat to an oven space or the like, thermostatically controlled means engaging the arm for moving it about its fulcrum, and resilient means engaging the arm and normally maintaining it against the fulcrum, said resilient means being of such character that during normal operation of the device the arm will move about its fulcrum upon operation of the thermostatic means, but in the event of interference with the pivotal movement of the arm, the resilient means will permit movement of the arm away from the fulcrum and a bodily movement of the arm with the movement of the thermostatic means.

14. A temperature controlling device comprising a support, a fulcrum on the support, an arm engaging one side of the fulcrum, spring means engaging the arm for normally maintaining the arm against its fulcrum, thermostatic means for moving the arm normally about its fulcrum, and means operatively connected to the arm for controlling the supply of heat to an oven space or the like, said spring means normally functioning to cause the arm to fulcrum about its fulcrum but permitting bodily movement of the arm away from its fulcrum upon movement of the thermostatic means, in the event of interference with the fulcruming movement of the arm.

15. A temperature control device comprising a support, an arm fulcrumed on the support, means operatively connected to the arm for controlling the supply of heat to an oven space or the like, thermostatic means for causing the arm to fulcrum about its fulcrum on the support, and means for normally causing such fulcruming action to occur during normal operation of the device, but permitting a bodily movement of the fulcrumed end of the arm with the thermostatic means, relative to the fulcrum, in the event of interference with fulcruming movement of the arm.

16. A temperature control device comprising a support, a member fulcrumed on the support, a valve including a valve element movable with the free end of the member for controlling the flow of gas to a burner, means permitting a continued movement of the free end of such member after the valve element reaches its valve closing position, a smaller valve including a valve element for opening and closing such valve, snap action means operatively connecting the free end of the member and such smaller valve element, and temperature control means for moving the member about its fulcrum, the parts being so arranged that the larger valve element closes the larger valve upon movement of the member, while allowing the smaller valve to remain open until a predetermined and continued movement of the member occurs when the smaller valve element snaps into its closed position.

17. A temperature control device comprising a support, a member fulcrumed on the support, a valve including a valve element movable with the free end of the member for controlling the flow of gas to a burner, means permitting a continued movement of the free end of the member after the valve element reaches its valve closing position, a smaller valve including a valve element for opening and closing such valve, an arm fulcrumed on the free end of the member and on the support at spaced points adjacent one end of the arm, a snap action element operatively connecting the free end of the arm and the smaller valve element, and temperature control means for moving the member about its fulcrum, the parts being so arranged that the larger valve closes upon movement of the member, while allowing the smaller valve to remain open for a predetermined time and until the member continues its movement through a predetermined distance when the smaller valve element snaps into its closed position.

18. A device for controlling the flow of gas to a burner for heating an oven space or the like, comprising a pair of valves, means for closing one valve when the temperature in the space approaches a predetermined degree, so as to reduce the flow to the burner and hence rate of temperature increase, snap action means for closing the other valve upon a further rise in temperature and temperature control means for actuating the valves in the sequential order mentioned.

19. A temperature control gas regulator for an oven or the like comprising means operable as the temperature increases in the oven for gradually reducing the supply of gas to the oven burner, means operable automatically for interrupting the reduction of gas flow after an interval depending upon temperature increase and then allowing gas to flow to the burner at a substantially constant smaller rate for an interval depending upon further temperature increase and then cutting off the supply of gas completely when the temperature reaches approximately a predetermined degree, and thermostatically controlled means for governing the operation of both of the first mentioned means.

20. A device for controlling the flow of gas to a burner for heating an oven or the like, comprising a valve for supplying a large quantity of gas to the burner, a valve for supplying a smaller quantity of gas to the burner, snap action means operable automatically for temporarily maintaining the small valve open after the larger valve is closed and then quickly closing the small valve substantially without any throttling of the gas flow therethrough and thermostatically controlled means operable automatically for closing the larger valve when the temperature approaches a predetermined degree and for actuating said snap action means when the temperature approximates said predetermined degree.

21. A temperature control gas regulator for an oven or the like comprising means operable as the temperature increases in the oven for gradually reducing the supply of gas to the oven burner, means operable automatically for interrupting the reduction of gas flow after an interval depending upon temperature increase, snap action controlled means for then allowing gas to flow to the burner at a substantially constant smaller rate for an interval depending upon further temperature increase and then cutting off the supply of gas completely when the temperature reaches approximately a predetermined degree, and thermostatically controlled means for governing the operation of both of the first mentioned means.

FRED E. BIRTCH.